(12) United States Patent
Chen

(10) Patent No.: US 8,973,877 B2
(45) Date of Patent: Mar. 10, 2015

(54) SUCKER WITH OPTIMUM SUCTION ATTACHMENT EFFECT

(71) Applicant: Tru-Miles Hardware Co., Ltd., Changhua County (TW)

(72) Inventor: Kuei-I Chen, Changhua County (TW)

(73) Assignee: Tru-Miles Hardware Co., Ltd., Changhua County (TW)

( * ) Notice: Subject to any disclaimer, the term of this patent is extended or adjusted under 35 U.S.C. 154(b) by 6 days.

(21) Appl. No.: 13/943,837

(22) Filed: Jul. 17, 2013

(65) Prior Publication Data

US 2014/0027588 A1 Jan. 30, 2014

(30) Foreign Application Priority Data

Jul. 26, 2012 (TW) .............................. 101214473 U

(51) Int. Cl.
*F16B 47/00* (2006.01)

(52) U.S. Cl.
CPC ............... *F16B 47/00* (2013.01); *F16B 47/006* (2013.01)
USPC ........................................ 248/205.7; 248/363

(58) Field of Classification Search
CPC F16B 47/00; F16B 47/006; B60R 2011/0056
USPC .......... 248/205.5, 205.8, 205.9, 206.2, 205.7, 248/363
See application file for complete search history.

(56) References Cited

U.S. PATENT DOCUMENTS

| | | | | |
|---|---|---|---|---|
| 1,426,930 A | * | 8/1922 | Waldron | 294/188 |
| 5,133,524 A | * | 7/1992 | Liu | 248/205.8 |
| 5,192,070 A | * | 3/1993 | Nagai et al. | 271/90 |
| 7,690,610 B2 | * | 4/2010 | Ristau | 248/206.2 |
| 7,841,568 B2 | * | 11/2010 | Takahashi et al. | 248/205.8 |
| 2013/0168523 A1 | * | 7/2013 | Summers et al. | 248/363 |

* cited by examiner

*Primary Examiner* — Steven Marsh
(74) *Attorney, Agent, or Firm* — Alan D. Kamrath; Kamrath IP Lawfirm, P.A.

(57) ABSTRACT

A sucker includes a sucker body having a rough suction layer which includes a plurality of protrusions which are juxtaposed to each other closely, and a plurality of grooves defined between the protrusions. When the rough suction layer presses an attached face and is disposed at a negative pressure state, the sucker body is pressed toward the attached face by a normal force from the ambient air, so that the rough suction layer is compressed, and the grooves form multiple independent negative pressure or vacuum zones, to increase a negative pressure of the rough suction layer, to decrease air existing in the rough suction layer, and to reduce a vacuum leak in the rough suction layer, so as to increase an air-tightness between the rough suction layer and the attached face.

3 Claims, 9 Drawing Sheets

SUCKER WITH OPTIMUM SUCTION ATTACHMENT EFFECT

BACKGROUND OF THE INVENTION

1. Field of the Invention

The present invention relates to an attachment device and, more particularly, to a sucker for attaching an article to an attached face, such as a wall, plane and the like.

2. Description of the Related Art

A conventional sucker in accordance with the prior art shown in FIG. 1 comprises a sucker body 10 and an air extraction mechanism 12 connected with the sucker body 10. The sucker body 10 has a side provided with an attachment portion 11 which has a periphery provided with an annular flange 111. The attachment portion 11 of the sucker body 10 has a surface provided with a plurality of slits 112 with circular or cruciform shape. The attachment portion 11 of the sucker body 10 has an interior provided with an air channel 113 connected between the slits 112 and the air extraction mechanism 12. In operation, when the flange 111 of the sucker body 10 abuts an attached face, the air extraction mechanism 12 is pressed successively to extract the air in the attachment portion 11 of the sucker body 10 outward so that the air in the attachment portion 11 of the sucker body 10 is introduced through the slits 112 and the air channel 113 and is drained outward from the air extraction mechanism 12, and the attachment portion 11 of the sucker body 10 is evacuated. Thus, the slits 112 of the attachment portion 11 of the sucker body 10 form a negative pressure or vacuum state so that the central portion of the sucker body 10 is attached to the attached face. However, when the attached face is uneven or unsmooth, the sucker body 10 cannot be attached to the attached face closely and tightly, so that the sucker body 10 is easily detached from the attached face during a long-term utilization. In addition, the contact area of the slits 112 of the sucker body 10 and the attached face is not large enough so that air will exist in the attachment portion 11 of the sucker body 10 after evacuation of the attachment portion 11 of the sucker body 10. Thus, the suction force of the sucker body 10 is reduced during a period of time so that the sucker body 10 is easily detached from the attached face.

BRIEF SUMMARY OF THE INVENTION

In accordance with one embodiment of the present invention, there is provided a sucker, comprising a sucker body. The sucker body includes a rough suction layer. The rough suction layer of the sucker body includes a plurality of protrusions which are juxtaposed to each other closely, and a plurality of grooves defined between the protrusions. In practice, when the rough suction layer of the sucker body presses an attached face and is disposed at a negative pressure state, the sucker body is pressed toward the attached face by a normal force from the ambient air, so that the rough suction layer of the sucker body is compressed, and the grooves of the rough suction layer form multiple independent negative pressure or vacuum zones, to increase a negative pressure of the rough suction layer, to decrease air existing in the rough suction layer of the sucker body, and to reduce a vacuum leak in the rough suction layer of the sucker body, so as to increase an air-tightness between the rough suction layer of the sucker body and the attached face. In such a manner, the rough suction layer of the sucker body is bonded onto the attached face closely and tightly so that when the attached face is an unsmooth or cracked face, the rough suction layer of the sucker body will not be detached from the attached face.

In accordance with another embodiment of the present invention, there is provided a sucker, comprising a sucker body, and a driving mechanism connected with the sucker body. The sucker body includes a rough suction layer, a support layer combined with the rough suction layer, a receiving chamber connected with the support layer, a mounting seat connected with the support layer, and an airtight control switch pivotally connected with the mounting seat. The rough suction layer of the sucker body is made of soft material, and the support layer of the sucker body is made of hard material. The rough suction layer of the sucker body includes a plurality of protrusions which are juxtaposed to each other closely, and a plurality of grooves defined between the protrusions. The rough suction layer of the sucker body has a central portion provided with an air recess which has an air channel. The receiving chamber of the sucker body is connected to the air channel of the rough suction layer. The mounting seat of the sucker body has a bottom provided with an air hole. The support layer of the sucker body has a side provided with a conduit connected between the air channel of the rough suction layer and the air hole of the mounting seat. In practice, when the rough suction layer of the sucker body presses an attached face and is disposed at a negative pressure state, the sucker body is pressed toward the attached face by a normal force from the ambient air, so that the rough suction layer of the sucker body is compressed, and the grooves of the rough suction layer form multiple independent negative pressure or vacuum zones, to increase a negative pressure of the rough suction layer, to decrease air existing in the rough suction layer of the sucker body, and to reduce a vacuum leak in the rough suction layer of the sucker body, so as to increase an air-tightness between the rough suction layer of the sucker body and the attached face. In such a manner, the rough suction layer of the sucker body is bonded onto the attached face closely and tightly so that when the attached face is an unsmooth or cracked face, the rough suction layer of the sucker body will not be detached from the attached face.

The primary objective of the present invention is to provide a sucker with an optimum suction attachment effect.

According to the primary advantage of the present invention, the rough suction layer of the sucker body contains multiple independent negative pressure or vacuum zones by provision of the grooves, to increase the negative pressure of the rough suction layer, to decrease the air existing in the rough suction layer of the sucker body, and to reduce the vacuum leak in the rough suction layer of the sucker body, so as to increase the air-tightness between the rough suction layer of the sucker body and the attached face so that the rough suction layer of the sucker body is attached to the attached face closely and tightly.

According to another advantage of the present invention, the sucker body is disposed at the optimum airtight suction state, so that even when the attached face is an unsmooth or cracked face, the rough suction layer of the sucker body is attached to the attached face exactly and will not be detached from the attached face.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
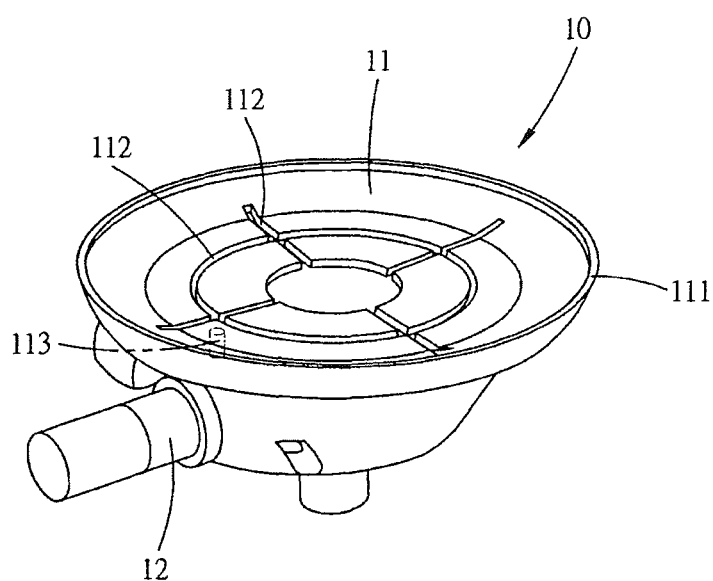
FIG. 1 is a perspective view of a conventional sucker in accordance with the prior art.
Figure 2:
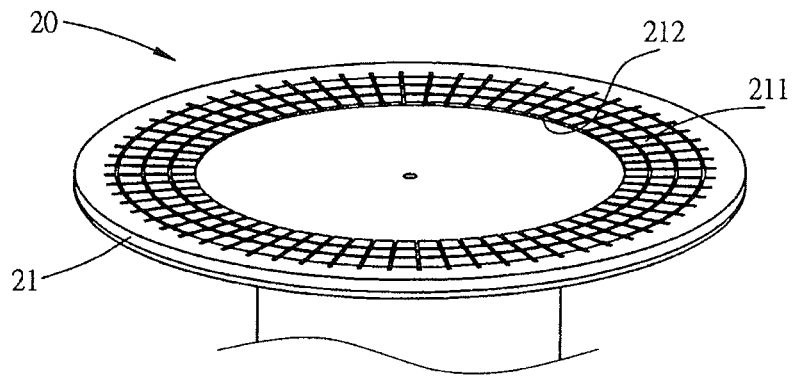
FIG. 2 is a perspective view of a sucker in accordance with the preferred embodiment of the present invention.
Figure 3:
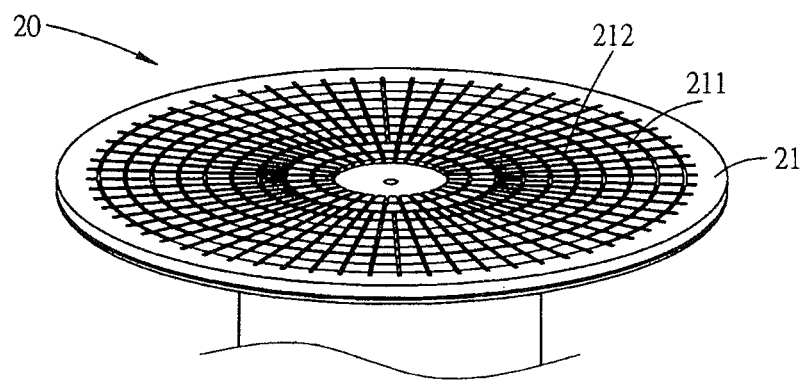
FIG. 3 is a perspective view of a sucker in accordance with another preferred embodiment of the present invention.
Figure 4:
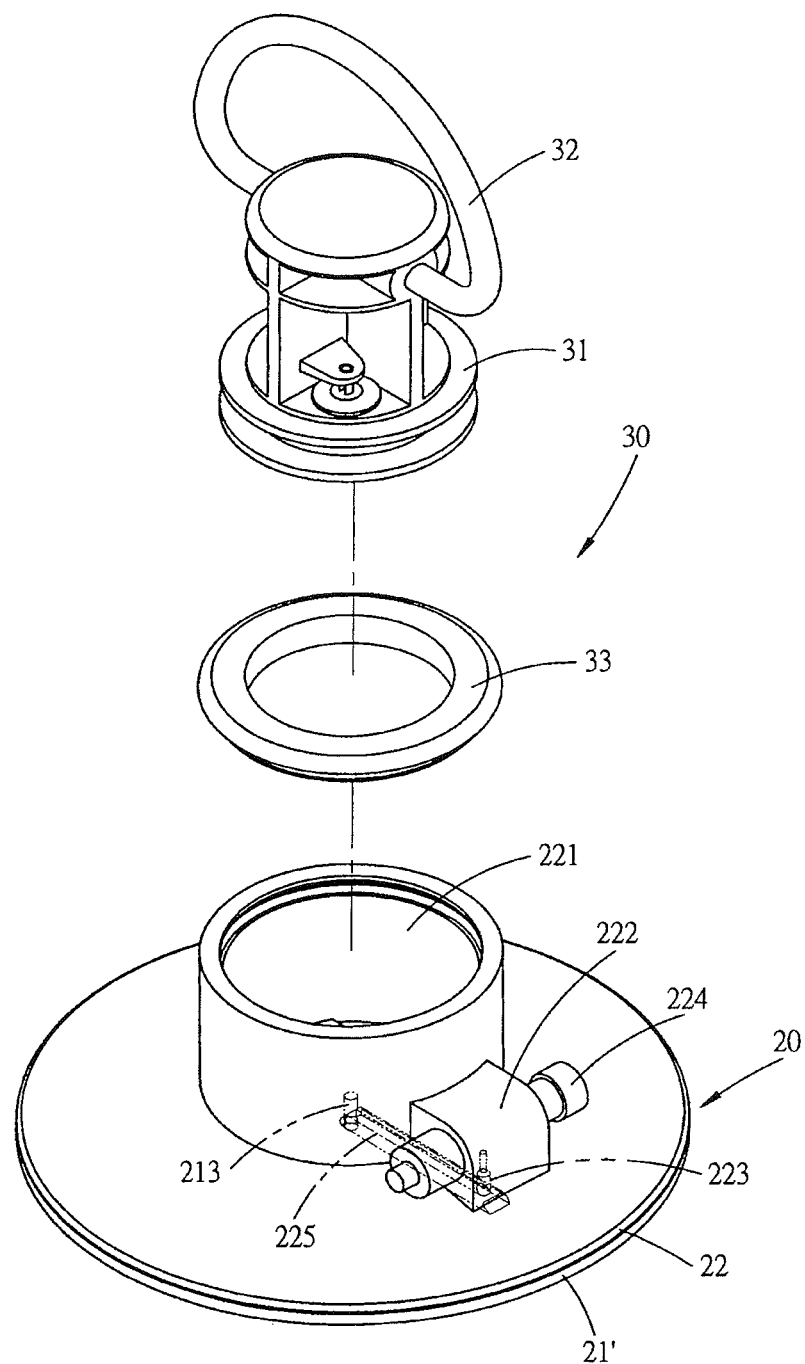
FIG. 4 is an exploded perspective view of a sucker in accordance with another preferred embodiment of the present invention.
Figure 5:
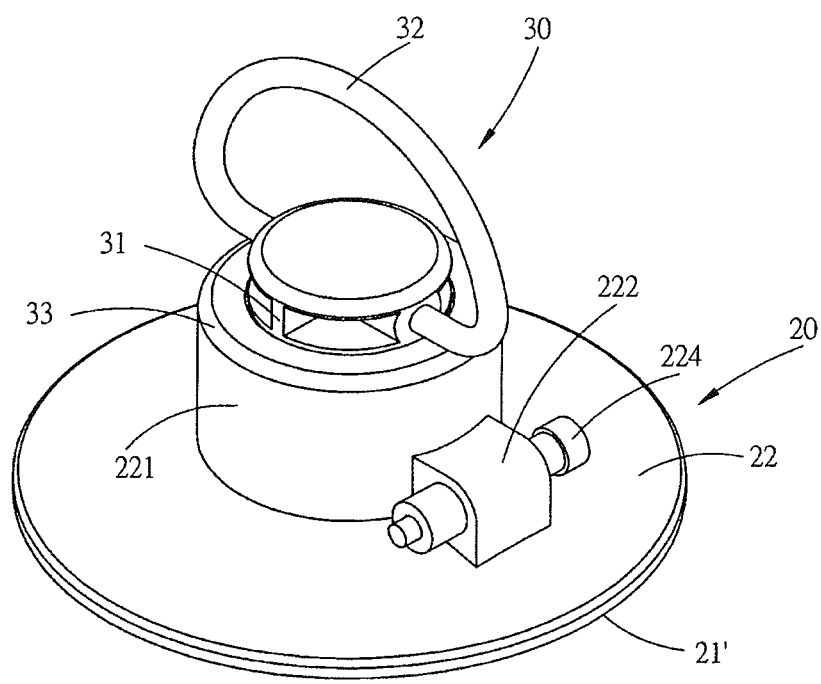
FIG. 5 is a perspective assembly view of the sucker as shown in FIG. 4.

Referring to the drawings and initially to FIGS. 2 and 3, a sucker in accordance with the preferred embodiment of the present invention comprises a sucker body 20. The sucker body 20 includes a rough suction layer 21. The rough suction layer 21 of the sucker body 20 has a planar shape and has a slightly adhesive feature. The rough suction layer 21 of the sucker body 20 includes a plurality of protrusions 211 which are juxtaposed to each other closely, and a plurality of grooves 212 defined between the protrusions 211. The protrusions 211 of the rough suction layer 21 are arranged in an annular shape. Preferably, the protrusions 211 of the rough suction layer 21 are distributed and extended through a peripheral surface of the rough suction layer 21 as shown in FIG. 2 or a whole circumferential surface of the rough suction layer 21 as shown in FIG. 3.

In practice, when the rough suction layer 21 of the sucker body 20 presses an attached face "A" (see FIG. 6) and is disposed at a negative pressure state, the sucker body 20 is pressed toward the attached face "A" by a normal force from the ambient air, so that the rough suction layer 21 of the sucker body 20 is compressed, and the grooves 212 of the rough suction layer 21 form multiple independent negative pressure or vacuum zones, to increase a negative pressure of the rough suction layer 21, to decrease air existing in the rough suction layer 21 of the sucker body 20, and to reduce a vacuum leak in the rough suction layer 21 of the sucker body 20, so as to increase an air-tightness between the rough suction layer 21 of the sucker body 20 and the attached face "A". In such a manner, the rough suction layer 21 of the sucker body 20 is bonded onto the attached face "A" closely and tightly so that when the attached face "A" is an unsmooth or cracked face, the rough suction layer 21 of the sucker body 20 will not be detached from the attached face "A".

Referring to FIGS. 4-9 with reference to FIGS. 2 and 3, a sucker in accordance with another preferred embodiment of the present invention comprises a sucker body 20, and a driving mechanism 30 connected with the sucker body 20.

The sucker body 20 includes a rough suction layer 21', a support layer 22 combined with the rough suction layer 21', a receiving chamber 221 connected with the support layer 22, a mounting seat 222 connected with the support layer 22 and located beside the receiving chamber 221, and an airtight control switch 224 pivotally connected with the mounting seat 222. The rough suction layer 21' of the sucker body 20 is made of soft material, and the support layer 22 of the sucker body 20 is made of hard material.

The rough suction layer 21' of the sucker body 20 has a planar shape and has a slightly adhesive feature. The rough suction layer 21' of the sucker body 20 includes a plurality of protrusions 211 which are juxtaposed to each other closely, and a plurality of grooves 212 defined between the protrusions 211. The protrusions 211 of the rough suction layer 21' are arranged in an annular shape. Preferably, the protrusions 211 of the rough suction layer 21' are distributed and extended through a peripheral surface of the rough suction layer 21' as shown in FIG. 2 or a whole circumferential surface of the rough suction layer 21' as shown in FIG. 3. The rough suction layer 21' of the sucker body 20 has a central portion provided with an air recess 214 which has an air channel 213.

The receiving chamber 221 of the sucker body 20 is connected to the air channel 213 of the rough suction layer 21'. The mounting seat 222 of the sucker body 20 has a bottom provided with an air hole 223. The air hole 223 of the mounting seat 222 is connected to the ambient environment. The support layer 22 of the sucker body 20 has a side provided with a conduit 225 connected between the air channel 213 of the rough suction layer 21' and the air hole 223 of the mounting seat 222. The airtight control switch 224 of the sucker body 20 is extended through the conduit 225 of the support layer 22, and is rotatable in the mounting seat 222 to open the conduit 225 of the support layer 22 so as to connect the air channel 213 of the rough suction layer 21' and the air hole 223 of the mounting seat 222 or to close the conduit 225 of the support layer 22 so as to interrupt a connection between the air channel 213 of the rough suction layer 21' and the air hole 223 of the mounting seat 222.

The driving mechanism 30 is mounted on the receiving chamber 221 of the sucker body 20 and is connected to the air channel 213 of the rough suction layer 21'. The driving mechanism 30 is a pull-type air extraction mechanism and includes a valve 31 movably mounted in the receiving chamber 221 of the sucker body 20, an airtight gasket 33 mounted on the receiving chamber 221 of the sucker body 20 and pressing the airtight gasket 33, and a pulling member 32 connected with the valve 31. The valve 31 of the driving mechanism 30 functions as a piston.

In practice, when the rough suction layer 21' of the sucker body 20 presses an attached face "A" (see FIG. 6) and is disposed at a negative pressure state, the sucker body 20 is pressed toward the attached face "A" by a normal force from the ambient air, so that the rough suction layer 21' of the sucker body 20 is compressed, and the grooves 212 of the rough suction layer 21' form multiple independent negative pressure or vacuum zones, to increase a negative pressure of the rough suction layer 21', to decrease air existing in the rough suction layer 21' of the sucker body 20, and to reduce a vacuum leak in the rough suction layer 21' of the sucker body 20, so as to increase an air-tightness between the rough suction layer 21' of the sucker body 20 and the attached face "A". In such a manner, the rough suction layer 21' of the sucker body 20 is bonded onto the attached face "A" closely and tightly so that when the attached face "A" is an unsmooth or cracked face, the rough suction layer 21' of the sucker body 20 will not be detached from the attached face "A".

Figure 6:
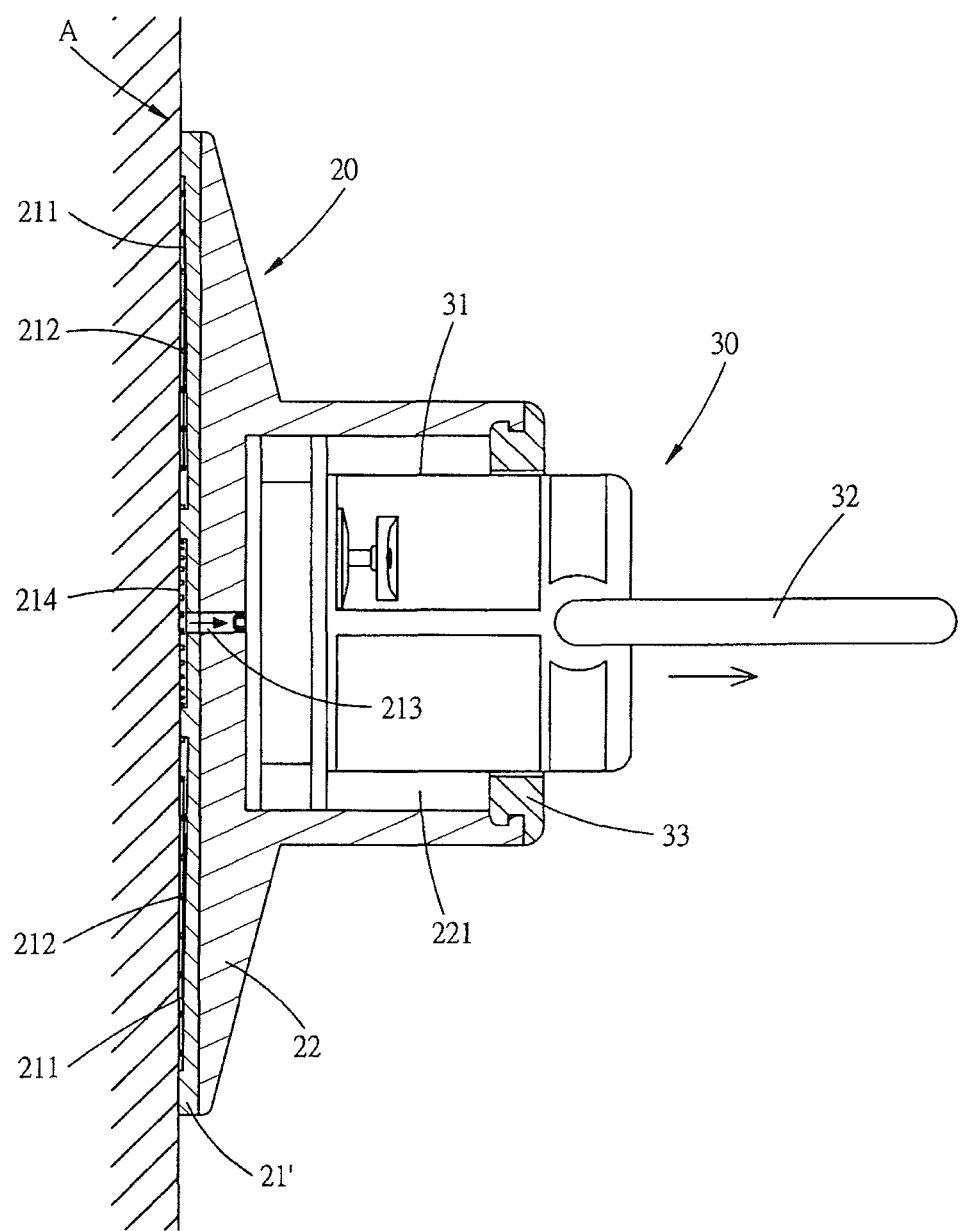
FIG. 6 is a side cross-sectional operational view of the sucker as shown in FIG. 5.
Figure 7:
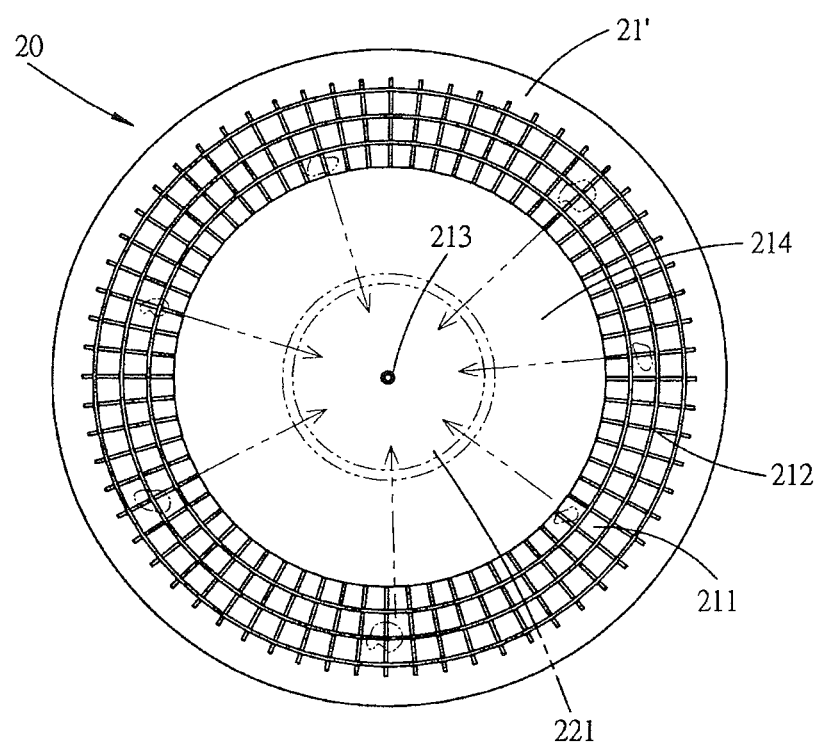
FIG. 7 is a front view of the sucker as shown in FIG. 6.
Figure 8:
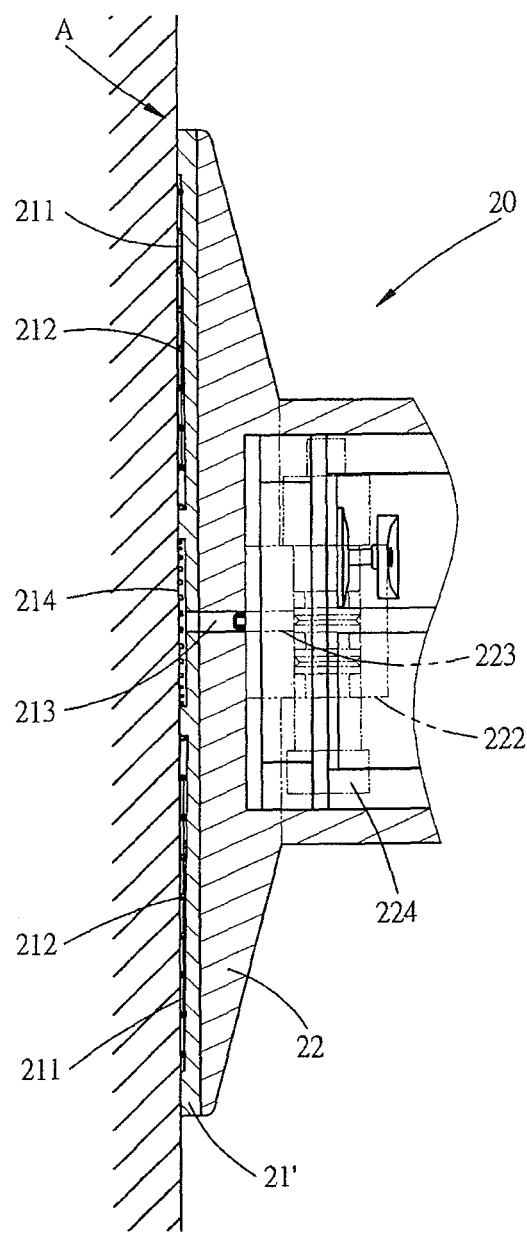
FIG. 8 is a schematic operational view of the sucker as shown in FIG. 6, showing that the sucker body is disposed at an airtight state.

In operation, the rough suction layer 21' of the sucker body 20 initially abuts the attached face "A". Then, the sucker body 20 is pressed toward the attached face "A". At this time, the rough suction layer 21' of the sucker body 20 has a planar shape and has a slightly adhesive feature, and the support layer 22 of the sucker body 20 is made of hard material, so that when the sucker body 20 is compressed, the rough suction layer 21' of the sucker body 20 presses the attached face "A" exactly. Then, the pulling member 32 of the driving mechanism 30 is pulled outward as shown in FIG. 6 to move the valve 31 outward from the receiving chamber 221 of the sucker body 20 to extract the air in the receiving chamber 221 of the sucker body 20 so that the sucker body 20 is evacuated. In such a manner, the rough suction layer 21' of the sucker body 20 is compressed, and the grooves 212 of the rough suction layer 21' form multiple independent negative pressure or vacuum zones, so that the air existing in the grooves 212 of the rough suction layer 21' is directed toward the air recess 214 of the rough suction layer 21' and is drawn outward from the air channel 213 of the rough suction layer 21' as shown in FIG. 7. Thus, the rough suction layer 21' of the sucker body 20 contains multiple independent negative pressure or vacuum zones by provision of the grooves 212, to increase the negative pressure of the rough suction layer 21', to decrease the air existing in the rough suction layer 21' of the sucker body 20, and to reduce the vacuum leak in the rough suction layer 21' of the sucker body 20, so as to increase the air-tightness between the rough suction layer 21' of the sucker body 20 and the attached face "A". Then, the airtight control switch 224 of the sucker body 20 is rotated in one direction to close the conduit 225 of the support layer 22 so as to interrupt the connection between the air channel 213 of the rough suction layer 21' and the air hole 223 of the mounting seat 222 as shown in FIG. 8. At this time, the sucker body 20 is disposed at the optimum airtight suction state, so that the rough suction layer 21' of the sucker body 20 is attached to the attached face "A" closely and tightly.

Figure 9:
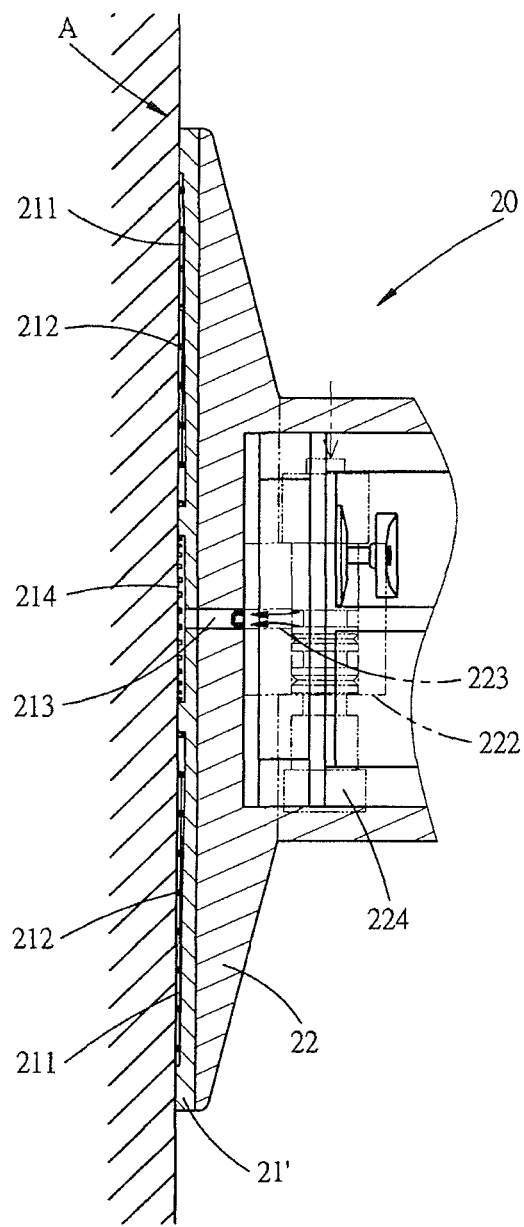
FIG. 9 is a schematic operational view of the sucker as shown in FIG. 6, showing that the sucker body is disposed at a released state.

When a user wishes to remove the sucker body 20 from the attached face "A", the airtight control switch 224 of the sucker body 20 is rotated in the other direction to open the conduit 225 of the support layer 22 so as to connect the air channel 213 of the rough suction layer 21' and the air hole 223 of the mounting seat 222 as shown in FIG. 9, and to connect the rough suction layer 21' of the sucker body 20 to the ambient environment, so that the rough suction layer 21' of the sucker body 20 is released and can be detached from the attached face "A".

Figure 10:
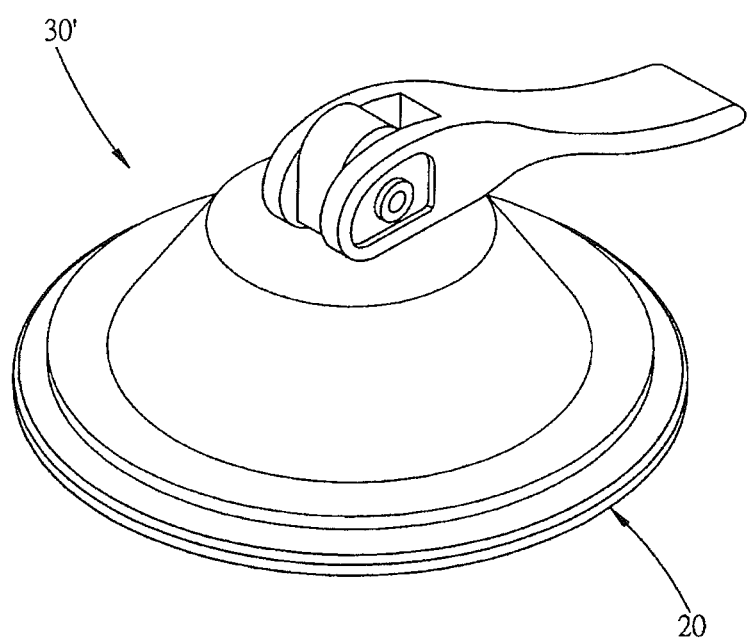
FIG. 10 is a perspective view of a sucker in accordance with another preferred embodiment of the present invention.

As shown in FIG. 10, the driving mechanism 30' is a pivotal handle type air extraction mechanism.

Accordingly, the rough suction layer 21' of the sucker body 20 contains multiple independent negative pressure or vacuum zones by provision of the grooves 212, to increase the negative pressure of the rough suction layer 21', to decrease the air existing in the rough suction layer 21' of the sucker body 20, and to reduce the vacuum leak in the rough suction layer 21' of the sucker body 20, so as to increase the air-tightness between the rough suction layer 21' of the sucker body 20 and the attached face "A" so that the rough suction layer 21' of the sucker body 20 is attached to the attached face "A" closely and tightly. In addition, the sucker body 20 is disposed at the optimum airtight suction state, so that even when the attached face "A" is an unsmooth or cracked face, the rough suction layer 21 of the sucker body 20 is attached to the attached face "A" exactly and will not be detached from the attached face "A".

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sucker comprising:
    a sucker body; and
    a driving mechanism connected with the sucker body; wherein:
    the sucker body includes:
        a rough suction layer;
        a support layer combined with the rough suction layer;
        a receiving chamber connected with the support layer;
        a mounting seat connected with the support layer; and
        an airtight control switch pivotally connected with the mounting seat;
    the rough suction layer of the sucker body is made of soft material;
    the support layer of the sucker body is made of hard material;
    the rough suction layer of the sucker body includes a plurality of protrusions juxtaposed to each other closely and a plurality of grooves defined between the plurality of protrusions;
    the rough suction layer of the sucker body has a central portion provided with an air recess which has an air channel;
    the receiving chamber of the sucker body is connected to the air channel of the rough suction layer;
    the mounting seat of the sucker body has a bottom provided with an air hole;
    the support layer of the sucker body has a side provided with a conduit connected between the air channel of the rough suction layer and the air hole of the mounting seat;
    when the rough suction layer of the sucker body presses an attached face and is disposed at a negative pressure state, the sucker body is pressed toward the attached face by a normal force from ambient air, so that the rough suction layer of the sucker body is compressed, and the plurality of grooves of the rough suction layer form multiple independent negative pressure or vacuum zones, to increase a negative pressure of the rough suction layer, to decrease air existing in the rough suction layer of the sucker body, and to reduce a vacuum leak in the rough suction layer of the sucker body, to increase an airtightness between the rough suction layer of the sucker body and the attached face; and
    the rough suction layer of the sucker body is bonded onto the attached face closely and tightly so that when the attached face is an unsmooth or cracked face, the rough suction layer of the sucker body will not be detached from the attached face.

2. The sucker of claim 1, wherein:
    the driving mechanism is mounted on the receiving chamber of the sucker body and is connected to the air channel of the rough suction layer; and
    the driving mechanism is a pull-type air extraction mechanism and includes:
        a valve movably mounted in the receiving chamber of the sucker body;
        an airtight gasket mounted on the receiving chamber of the sucker body and pressing the airtight gasket; and
        a pulling member connected with the valve.

3. The sucker of claim 1, wherein the driving mechanism is a pivotal handle type air extraction mechanism.

* * * * *